United States Patent
Liu et al.

(10) Patent No.: US 10,435,773 B2
(45) Date of Patent: Oct. 8, 2019

(54) RAPIDLY SOLIDIFIED HIGH-TEMPERATURE ALUMINUM IRON SILICON ALLOYS

(71) Applicant: GM Global Technology Operations LLC, Detroit, MI (US)

(72) Inventors: Zhongyi Liu, Troy, MI (US); Anil K. Sachdev, Rochester Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 16/375,099

(22) Filed: Apr. 4, 2019

(65) Prior Publication Data

US 2019/0226069 A1  Jul. 25, 2019

Related U.S. Application Data

(63) Continuation of application No. 15/384,889, filed on Dec. 20, 2016, now Pat. No. 10,294,552.

(Continued)

(51) Int. Cl.
C22C 45/08 (2006.01)
C22C 1/00 (2006.01)

(52) U.S. Cl.
CPC ........... C22C 45/08 (2013.01); C22C 1/002 (2013.01)

(58) Field of Classification Search
CPC ................. C22C 45/08; C22C 1/002
See application file for complete search history.

(56) References Cited

U.S. PATENT DOCUMENTS 4,595,429 A * 6/1986 Le Caer ............... C22C 45/08
                                                         148/403
4,710,246 A   12/1987 Le Caer et al.
(Continued)

FOREIGN PATENT DOCUMENTS

CN        1886213 A    12/2006
CN      101443482 A     5/2009
(Continued)

OTHER PUBLICATIONS

Seong Woo Kim et al.; "Removal of primary iron rich phase from aluminum-silicon melt by centrifugal separation"; Overseas Foundry, vol. 10, No. 2; Mar. 2013; pp. 112-117.
(Continued)

*Primary Examiner* — Cam N. Nguyen
(74) *Attorney, Agent, or Firm* — Harness, Dickey & Pierce, P.L.C.

(57) ABSTRACT

High-strength, lightweight alloy components, such as automotive components, capable of high temperature performance comprising aluminum, silicon, and iron and/or nickel are provided, along with methods of making such high-strength, lightweight alloy components. A high-energy stream, such as a laser or electron beam, may be selectively directed towards a precursor material to melt a portion of the precursor material in a localized region. The molten precursor material is cooled at a rate of greater than or equal to about $1.0 \times 10^5$ K/second to form a solid high-strength, lightweight alloy component comprising a stable ternary cubic phase having high heat resistance and high strength. The stable ternary phase may be $Al_xFe_ySi_z$, where x ranges from about 4 to about 5 or about 7.2 to about 7.6, y is about 1.5 to about 2.2, and z is about 1. The stable ternary phase may also be $Al_6Ni_3Si$.

20 Claims, 4 Drawing Sheets

Related U.S. Application Data (60) Provisional application No. 62/287,725, filed on Jan. 27, 2016.

(56) References Cited

U.S. PATENT DOCUMENTS

| | | | | |
|---|---|---|---|---|
| 4,729,790 | A | 3/1988 | Skinner | |
| 4,731,133 | A | 3/1988 | Dermarkar | |
| 4,743,317 | A | 5/1988 | Skinner et al. | |
| 4,878,967 | A | 11/1989 | Adam et al. | |
| 4,879,095 | A | 11/1989 | Adam et al. | |
| 4,917,739 | A * | 4/1990 | Adam | C22C 45/08 148/437 |
| 4,992,117 | A * | 2/1991 | Okubo | C22C 45/08 148/439 |
| 5,053,085 | A * | 10/1991 | Masumoto | C22C 45/08 148/403 |
| 5,152,829 | A | 10/1992 | Skinner et al. | |
| 5,204,191 | A * | 4/1993 | Dubois | C22C 45/08 126/390.1 |
| 5,240,517 | A | 8/1993 | Matsumoto | C22C 45/08 148/403 |
| 5,284,532 | A | 2/1994 | Skinner | |
| 5,312,494 | A | 5/1994 | Horimura et al. | |
| 5,320,688 | A * | 6/1994 | Masumoto | C22C 45/08 148/403 |
| 5,332,455 | A * | 7/1994 | Chang | B23K 35/286 148/439 |
| 5,332,456 | A * | 7/1994 | Masumoto | C22C 21/00 148/415 |
| 5,334,266 | A * | 8/1994 | Kawanishi | C22C 21/00 148/403 |
| 5,338,168 | A * | 8/1994 | Kondoh | C22C 1/0416 148/437 |
| 5,344,507 | A * | 9/1994 | Masumoto | C22C 1/0416 148/437 |
| 5,368,658 | A * | 11/1994 | Masumoto | C22C 45/08 148/403 |
| 5,405,462 | A * | 4/1995 | Masumoto | C22C 21/00 148/415 |
| 5,415,709 | A * | 5/1995 | Kita | C22C 1/0416 148/437 |
| 5,431,751 | A * | 7/1995 | Okochi | C22C 21/00 148/403 |
| 5,454,855 | A * | 10/1995 | Kita | C22C 1/0416 148/438 |
| 5,454,884 | A * | 10/1995 | Hashimoto | C22C 45/00 148/403 |
| 5,482,577 | A * | 1/1996 | Hashimoto | C22C 45/00 148/403 |
| 5,509,978 | A * | 4/1996 | Masumoto | C22C 21/00 148/403 |
| 5,522,948 | A | 6/1996 | Sawa et al. | |
| 5,578,144 | A * | 11/1996 | Satou | C22C 21/00 148/415 |
| 5,587,028 | A * | 12/1996 | Hashimoto | C22C 45/00 148/403 |
| 5,714,018 | A * | 2/1998 | Kita | C22C 21/00 148/415 |
| 5,718,777 | A * | 2/1998 | Hashimoto | C22C 45/00 148/403 |
| 6,149,737 | A * | 11/2000 | Hattori | C22C 21/00 148/403 |
| 6,712,915 | B2 | 3/2004 | Symko et al. | |
| 7,380,583 | B2 | 6/2008 | Gallemeault et al. | |
| 7,465,333 | B1 | 12/2008 | Halalay et al. | |
| 7,901,521 | B2 * | 3/2011 | Fujita | C22C 45/08 148/403 |
| 7,919,174 | B2 | 4/2011 | Ruokolainen et al. | |
| 8,052,224 | B2 | 11/2011 | Luo et al. | |
| 8,328,971 | B2 | 12/2012 | Kia et al. | |
| 9,103,022 | B2 * | 8/2015 | Wei | C22C 45/08 |
| 2009/0183996 | A1 | 7/2009 | Richter et al. | |
| 2009/0226755 | A1 | 9/2009 | Sigler et al. | |
| 2010/0092790 | A1 | 4/2010 | Luo et al. | |
| 2010/0290942 | A1 | 11/2010 | Becker et al. | |
| 2013/0121869 | A1 | 5/2013 | Kulkarni et al. | |
| 2014/0227553 | A1 | 8/2014 | Im et al. | |
| 2015/0167130 | A1 | 6/2015 | Steinwandel et al. | |
| 2017/0136697 | A1 | 5/2017 | Kia et al. | |
| 2017/0136698 | A1 | 5/2017 | Kia et al. | |
| 2017/0211168 | A1 | 7/2017 | Liu et al. | |
| 2018/0044765 | A1 | 2/2018 | Liu et al. | |
| 2018/0216501 | A1 | 8/2018 | Brown et al. | |
| 2018/0216658 | A1 | 8/2018 | Brown et al. | |
| 2018/0237890 | A1 | 8/2018 | Liu et al. | |

FOREIGN PATENT DOCUMENTS

| | | |
|---|---|---|
| CN | 103642991 A | 3/2014 |
| CN | 103842527 A | 6/2014 |
| CN | 107008902 A | 8/2017 |
| DE | 102017200968 A1 | 7/2017 |
| JP | H0252683 B2 | 11/1990 |

OTHER PUBLICATIONS

First Office Action for Chinese Patent Application No. 201710061115.5 dated Jun. 1, 2018 with English language machine translation, 9 pages.

* cited by examiner

RAPIDLY SOLIDIFIED HIGH-TEMPERATURE ALUMINUM IRON SILICON ALLOYS

CROSS-REFERENCE TO RELATED APPLICATIONS

This application is a continuation of U.S. patent application Ser. No. 15/384,889 filed on Dec. 20, 2016 which issued as U.S. Pat. No. 10,294,552, which claims the benefit of U.S. Provisional Application No. 62/287,725, filed on Jan. 27, 2016. The entire disclosures of the above applications are incorporated herein by reference.

FIELD

The present disclosure relates to methods for forming high-temperature alloys comprising aluminum, iron, and silicon.

INTRODUCTION

This section provides background information related to the present disclosure which is not necessarily prior art.

Lightweight metal components have become an important focus for manufacturing vehicles, especially automobiles, where continual improvement in performance and fuel efficiency is desirable. Other lightweight metal components for automotive applications are often made of aluminum and/or magnesium alloys. Such lightweight metals can form load bearing components that need to be strong and stiff, while having good strength and ductility (e.g., elongation). High strength and ductility are particularly important for safety requirements and durability in vehicles like automobiles. While conventional steel and titanium alloys provide high temperature strength these alloys are, respectively, either heavy or expensive.

An exemplary lightweight metal alloy for forming structural components in a vehicle is an aluminum-containing alloy. Conventionally, aluminum-containing alloys can be formed by bulk formation processes, like wrought processes such as extrusion, rolling, forging, stamping, or casting techniques, such as die-casting, sand casting, investment casting, permanent-mold casting, and the like.

When casting or working lightweight alloys, industry standards and limitations during the formation process typically determine which alloy materials and alloying constituents are selected. Alloy selection is ultimately tailored to the microstructural properties that are needed for the part and what can be achieved based on typical formation process conditions. Strength and other alloy properties could be further improved in view of these conventional casting and working techniques. Lightweight metal castings, such as aluminum castings, need higher strength levels commensurate with those of high strength wrought aluminum and steel stampings. Thus, there is an ongoing need for improved formation processes to form improved lightweight metal components from alloys having suitable strength and ductility among other characteristics.

SUMMARY

This section provides a general summary of the disclosure, and is not a comprehensive disclosure of its full scope or all of its features.

In certain aspects, the present disclosure provides methods of making a high-strength, lightweight alloy component suitable for exposure to elevated temperatures. The method may include directing a high-energy stream towards a precursor material in a localized region to melt a portion of the precursor material in the localized region. The high-energy stream may be laser or an electron beam. The precursor material includes aluminum, silicon, and iron. Then, the molten precursor material is cooled at a rate of greater than or equal to about $1.0 \times 10^5$ K/second to form a solid high strength, lightweight alloy component. The solid high strength, lightweight alloy component includes a stable $Al_xFe_ySi_z$ phase, wherein x ranges from about 4 to about 5 or about 7.2 to about 7.6, y is about 1.5 to about 2.2, and z is about 1.

In certain variations, the solid high-strength lightweight alloy component includes greater than or equal to about 50% by volume of the stable $Al_xFe_ySi_z$ phase.

In other variations, the stable $Al_xFe_ySi_z$ phase has a formula represented by $Al_4Fe_{1.7}Si$ or $Al_5Fe_2Si$, with a composition including aluminum at greater than or equal to about 64.5 to less than or equal to about 66 atomic weight %; iron at about 24.5 atomic weight %; and silicon at greater than or equal to about 9.5 to less than or equal to about 11 atomic weight %.

In yet other variations, the stable $Al_xFe_ySi_z$ phase has an (a) lattice parameter of about 0.7509 nm and a (c) lattice parameter of about 0.7594 nm and a space group of $P6_3/mmc$.

In certain variations, the solid high-strength lightweight alloy component includes greater than or equal to about 80% by volume of the stable $Al_xFe_ySi_z$ phase.

In other variations, the precursor material further includes less than or equal to about 0.5 mass % of an alloying element selected from the group consisting of: manganese, copper, and combinations thereof, wherein the stable $Al_xFe_ySi_z$ phase is formed by converting an intermediate phase having a formula represented by $Al_{7.4}Fe_2Si$ to a hexagonal crystal structure by incorporation of the alloying element.

In certain other variations, the cooling of the molten precursor material is at a rate of greater than or equal to about $1.0 \times 10^7$ K/second.

In yet other variations, the directing of the high-energy stream is a process selected from the group consisting of: direct metal laser sintering, electron beam direct metal melting systems, and combinations thereof, wherein a temperature within the localized region is raised to greater than or equal to about 997° C.

In some variations, the precursor material is a powder material.

In other variations, the powder material is a combination of elemental powders or a pre-alloyed powder.

In certain other variations, the localized region has a volumetric size of less than or equal to about 100 μm³.

In other aspects, the present disclosure provides a solid high-strength, lightweight alloy component including greater than or equal to about 50 volume % of a stable $Al_xFe_ySi_z$ phase. X ranges from about 4 to about 5 or about 7.2 to about 7.6, y ranges from about 1.5 to about 2.2, and z is about 1. In certain variations, the solid high-strength, lightweight alloy component may include greater than or equal to about 80 volume % of the stable $Al_xFe_ySi_z$ phase.

In certain variations, the stable $Al_xFe_ySi_z$ phase has a formula represented by $Al_4Fe_{1.7}Si$ or $Al_5Fe_2Si$, with a composition including aluminum at greater than or equal to about 64.5 to less than or equal to about 66 atomic weight %; iron at about 24.5 atomic weight %; and silicon at greater than or equal to about 9.5 to less than or equal to about 11 atomic weight %.

In other variations, the stable $Al_xFe_ySi_z$ phase has an (a) lattice parameter of about 0.7509 nm and a (c) lattice parameter of about 0.7594 nm and a space group of $P6_3/mmc$.

In yet other variations, the solid high-strength lightweight alloy component includes greater than or equal to about 80% by volume of the stable $Al_xFe_ySi_z$ phase.

In certain variations, the precursor material further includes less than or equal to about 0.5 weight % of an alloying element selected from the group consisting of: manganese, copper, and combinations thereof, where x ranges from about 7.2 to about 7.6.

In yet other aspects, the present disclosure provides a method of making a high-strength, lightweight alloy component. In such a method, a high-energy stream is directed towards a precursor material in a localized region to melt a portion of the precursor material in the localized region. The high-energy stream may be laser or an electron beam. The precursor material includes aluminum, silicon, and at least one of iron or nickel. Next, the molten precursor material is cooled at a rate of greater than or equal to about $1.0 \times 10^5$ K/second to form a solid high-strength, lightweight alloy component including a stable ternary phase having high heat resistance and high strength.

In certain aspects, such a solid high-strength lightweight alloy component includes greater than or equal to about 50% by volume of the stable ternary phase and the stable ternary phase is $Al_xFe_ySi_z$, wherein x ranges from about 4 to about 5 or about 7.2 to about 7.6, y is about 1.5 to about 2.2, and z is about 1. In certain variations, the solid high-strength, lightweight alloy component may include greater than or equal to about 80 volume % of the stable ternary $Al_xFe_ySi_z$ phase.

In other aspects, such a solid high-strength lightweight alloy component includes greater than or equal to about 50% by volume of the stable ternary phase and the stable ternary phase is $Al_6Ni_3Si$, including aluminum at greater than or equal to about 58.6 to less than or equal to about 61 atomic weight %; nickel at about 30 atomic weight %; and silicon at greater than or equal to about 9 to less than or equal to about 11.4 atomic weight %. In certain variations, the solid high-strength, lightweight alloy component may include greater than or equal to about 80 volume % of the stable $Al_6Ni_3Si$ phase.

In certain variations, the solid high-strength lightweight alloy component includes greater than or equal to about 80% by volume of the stable ternary phase and the stable ternary phase is $Al_xFe_ySi_z$, wherein x ranges from about 4 to about 5 or about 7.2 to about 7.6, y is about 1.5 to about 2.2, and z is about 1.

In other variations, the solid high-strength lightweight alloy component includes greater than or equal to about 80% by volume of the stable ternary phase and the stable ternary phase is $Al_6Ni_3Si$, including aluminum at greater than or equal to about 58.6 to less than or equal to about 61 atomic weight %; nickel at about 30 atomic weight %; and silicon at greater than or equal to about 9 to less than or equal to about 11.4 atomic weight %.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 3A-3C show scanning electron micrographs (SEM) of melt-spun ribbons comprising aluminum, iron, and silicon in accordance with certain aspects of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

As referred to herein, the word "substantially," when applied to a characteristic of a composition or method of this disclosure, indicates that there may be variation in the characteristic without having a substantial effect on the chemical or physical attributes of the composition or method.

In various aspects, the present disclosure relates to methods of forming high-strength, lightweight alloy components by using high-energy processing to stabilize high-temperature desirable phases in low-cost iron-aluminum-silicon material systems. The present disclosure further relates to high-strength, lightweight alloy components comprising such desirable phases, especially stable $Al_xFe_ySi_z$ phases, as will be discussed further herein.

Aluminum, iron, and silicon are relatively abundant materials. Theoretically, iron aluminides (e.g., quasi-equilibrium cubic $Al_xFe_ySi_z$ ternary phases) have extreme properties at densities approaching titanium, but with costs that are an order of magnitude less than titanium. For example, cubic $Al_xFe_ySi_z$ phases have exceptional stiffness and high temperature strength, along with high oxidation resistance due to the presence of large amounts of aluminum. Cubic systems desirably exhibit at least 5 slip systems for good ductility. However, the formation of such stable cubic $Al_xFe_ySi_z$ phases in the iron-aluminum-silicon materials systems can be challenging, as such stable cubic phases only occur within a narrow processing window. The iron-aluminum-silicon material system has at least 11 ternary phases; however, only select ternary phases that are of interest for being cubic and stable at high temperatures.

Current processing methods cannot stabilize such a desirable cubic $Al_xFe_ySi_z$ phase to the extent it can be used as a primary phase in a material. In conventional manufacturing processes, such $Al_xFe_ySi_z$ phases have only been previously formed as an intermetallic phase distributed in relatively minor amounts within a matrix of other phase(s) or as a precipitate. In conventional bulk formation processes, a large volume of the precursor material is heated, for example, as a molten material that is cast, or a material that is wrought, or otherwise processed in bulk to form a component. Due to the heat capacity of the alloy and the large volumes of material bulk processed in conventional manufacturing processes for aluminum alloys, it has not been possible to form a component having a predominant or major phase with of one or more of such desirable $Al_xFe_ySi_z$ phases due to relatively slow cooling rates that prohibit formation and preservation of the desired microstructural phase.

In various aspects, the present disclosure contemplates methods of making a solid high-strength, lightweight alloy component predominantly comprising a stable $Al_xFe_ySi_z$ phase. In certain aspects, x may range from about 4 to about 5 or alternatively from about 7.2 to about 7.6. Y may range from about 1.5 to about 2.2. Z may be about 1. In certain other aspects, a component that predominantly comprises a stable $Al_xFe_ySi_z$ phase has greater than or equal to about 45 volume % of the microstructure comprising the stable cubic $Al_xFe_ySi_z$ phase. In yet other aspects, a component that predominantly comprises a stable $Al_xFe_ySi_z$ phase optionally may have a major amount of the stable $Al_xFe_ySi_z$ phase at greater than or equal to about 50 volume % of the microstructure.

In certain preferred aspects, a component that predominantly comprises a stable $Al_xFe_ySi_z$ phase has greater than or equal to about 50% by volume of the stable phase, optionally greater than or equal to about 60% by volume, optionally greater than or equal to about 75% by volume, optionally greater than or equal to about 80% by volume, optionally greater than or equal to about 85% by volume, optionally greater than or equal to about 90% by volume, optionally greater than or equal to about 95% by volume, optionally greater than or equal to about 97% by volume, optionally greater than or equal to about 98% by volume, and optionally greater than or equal to about 99% by volume of the stable $Al_xFe_ySi_z$ phase in other aspects. In certain aspects, the microstructure of the component comprises greater than or equal to about 80 volume % to less than or equal to about 100 volume % of the stable $Al_xFe_ySi_z$ phase. As will be discussed in further detail below, the present disclosure in certain aspects provides the capability to form a stabilized high-symmetry lightweight (distorted face centered cubic (FCC)) $Al_4Fe_{1.7}Si$ ternary phase from the Fe—Al—Si system.

Figure 1:
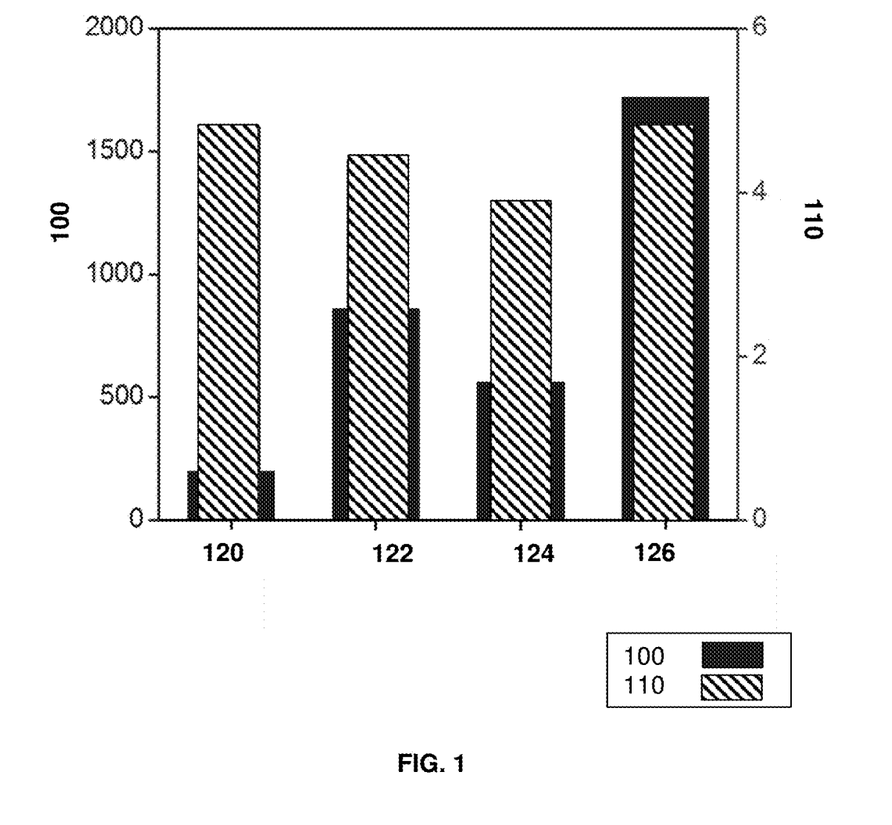
FIG. 1 is a chart comparing tensile strength (MPa) and density (g/cm$^3$) at room temperature for four metal compositions, namely $Al_3Fe$, Ti, TiAl, and $Al_4Fe_{1.7}Si$.

FIG. 1 shows a chart comparing tensile strength at room temperature (labeled 100 with units of MPa) and density (labeled 110 with units of g/cm³) of different materials, including $Al_3Fe$ labeled 120, Ti labeled 122, TiAl labeled 124, and $Al_4Fe_{1.7}Si$ labeled 126. A tensile strength for $Al_4Fe_{1.7}Si$ is estimated from Al—Fe—Si ternary precipitate hardness found in S. W. Kim et al., Overseas Foundry, 10, 3, (2013), the relevant portions of which are incorporated herein by reference. $Al_4Fe_{1.7}Si$ 126 has a density of less than 5 g/cm³ similar to $Al_3Fe$ 120, Ti 122, and TiAl 124, while exhibiting an estimated tensile strength above about 1,600 MPa, well in excess of any of the other comparative materials. Ti 122 has the closest tensile strength at under about 900 MPa.

Figure 2:
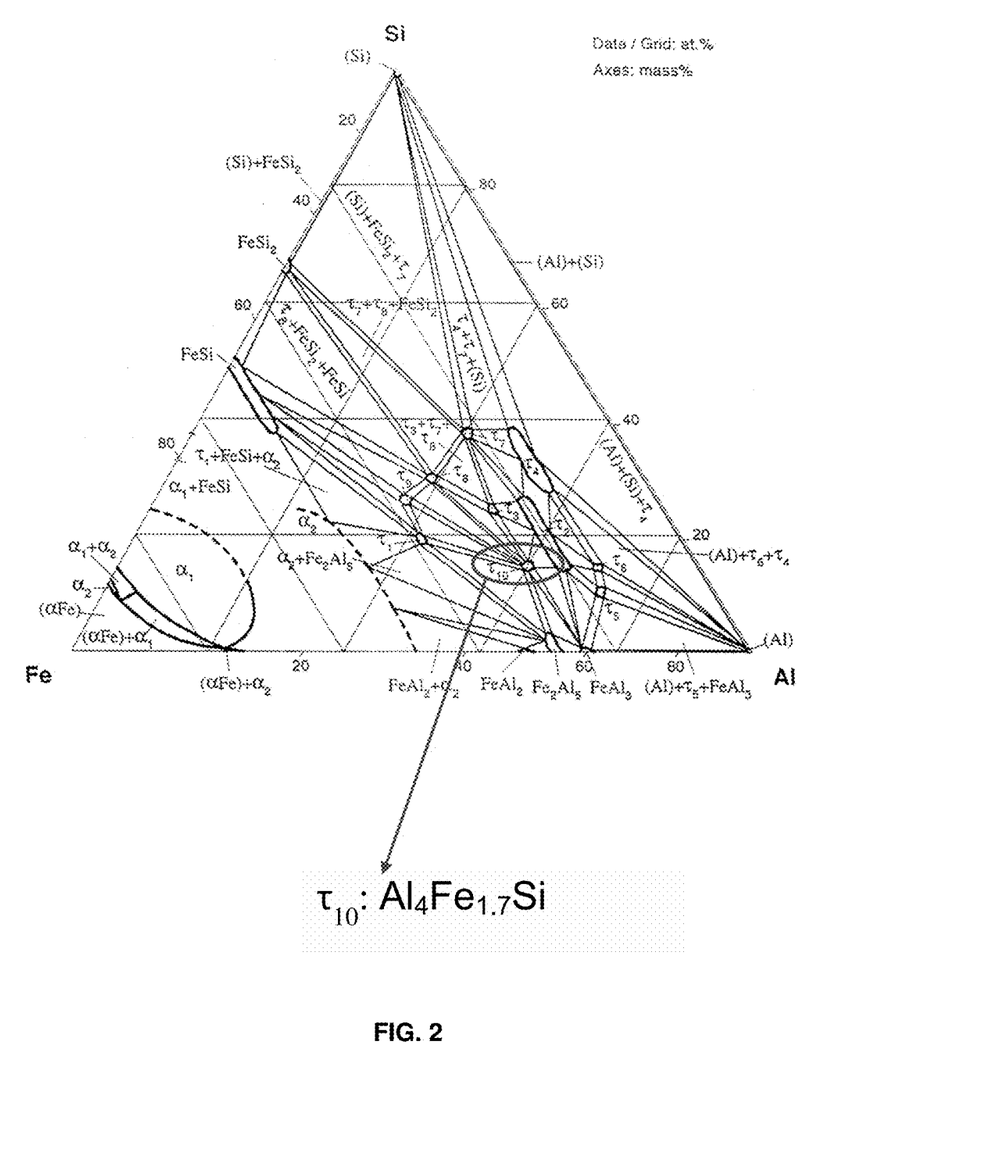
FIG. 2 is a phase diagram for a ternary system comprising aluminum iron and silicon with phase $\tau_{10}(Al_4Fe_{1.7}Si)$ identified.

FIG. 2 shows a ternary phase diagram of an aluminum iron and silicon system. A stabilized high-symmetry lightweight (distorted face centered cubic (FCC)) phase of interest with the formula $Al_xFe_ySi_z$ is $\tau_{10}$, which is circled in the phase diagram in FIG. 2. The $\tau_{10}$ phase can be represented by a formula of $Al_4Fe_{1.7}Si$ or $Al_5Fe_2Si$ that are generally interchangeable to reflect the compositional range of the phase. Thus, the stable $Al_xFe_ySi_z$ phase according to certain aspects of the present disclosure has a formula represented by $Al_4Fe_{1.7}Si$ or $Al_5Fe_2Si$ and may have a composition comprising aluminum at greater than or equal to about 64.5 to less than or equal to about 66 atomic weight %; iron at about 24.5 atomic weight %; and silicon at greater than or equal to about 9.5 to less than or equal to about 11 atomic weight %. A melting point of $Al_4Fe_{1.7}Si$ is 997° C.

The $Al_xFe_ySi_z$ ternary phase may thus be represented by $Al_4Fe_{1.7}Si$ or $Al_5Fe_2Si$, which are used interchangeably herein. Crystallographic data has lattice parameters of a=0.7509 nm and c=0.7594 nm. A space group for the stable $Al_xFe_ySi_z$ phase is P6₃/mmc and Pearson symbol is hP28. A structure type of the stable $Al_xFe_ySi_z$ phase is a $Co_2Al_5$ type or a distorted FCC.

In another variation, the stable $Al_xFe_ySi_z$ phase is formed by converting an intermediate phase to the desired stable cubic phase by including an alloying ingredient into the precursor material. A hexagonal crystal structure with composition of $Al_{7.4}Fe_2Si$ can be converted to a cubic crystal structure by dissolving trace or small amounts of alloying metals into the hexagonal structure. The alloying metal ingredient may be selected from manganese, copper, and combinations thereof. The generated new cubic crystal structure can provide good mechanical properties. For example, such a cubic structure has up to 12 slip systems which meet the criterion of desirably having at least 5 slip systems for a good ductility.

The crystallographic data of the intermediate phase is $Al_{7.4}Fe_2Si$ (hexagonal) with lattice parameters of a=1.2404 nm and c=2.6234 nm. After the introduction of the alloying ingredient(s) above, a new stable $Al_{7.4}Fe_2Si$ (cubic) phase is formed with an "a" lattice parameter of about 1.250 nm to 1.270 nm.

As such, the present disclosure utilizes rapid solidification rates and associated non-equilibrium processing to stabilize high-symmetry lightweight phases, such as (distorted FCC) $Al_4Fe_{1.7}Si$ ternary phase in an Fe—Al—Si system. Formation of such a stable phase is not possible at cooling rates obtained with conventional processing, which has limited the properties of materials produced from this low-cost system. Such techniques may also be used for forming desirable phases that have been difficult to isolate for other material systems.

For example, in an aluminum nickel and silicon system, there are five ternary phases. One phase, $Al_6Ni_3Si$, is cubic and has desired density and mechanical properties. Thus, in certain variations, the component that is formed comprises an $Al_xNi_ySi_z$ phase, where x ranges from about 5.8 to about 6.2, y ranges from about 2.8 to about 3.2, and z is about 1. This phase has a formula represented by $Al_6Ni_3Si$ and may have a composition comprising aluminum at greater than or equal to about 58.6 to less than or equal to about 61 atomic weight %; nickel at about 30 atomic weight %; and silicon at greater than or equal to about 9 to less than or equal to about 11.4 atomic weight %. The melting point of this ternary phase is about 778° C. The $Al_6Ni_3Si$ phase has lattice parameters of a=0.8316 to 0.8305 nm. A space group for the stable $Al_6Ni_3Si$ phase is Im-3m and a Pearson symbol of cI40. A structure type of the stable $Al_6Ni_3Si$ cubic phase is $Ge_7Ir_3$.

In certain aspects, the method thus includes directing a high-energy stream towards a precursor material in a localized region. A high energy stream deposits sufficient energy in the precursor to locally heat the material. The directing of the high-energy stream melts a portion of the precursor material in a localized region. For example, the melting point of the $Al_4Fe_{1.7}Si$ phase is 997° C.; therefore the high energy stream locally heats the material to a temperature above the melting point of 997° C. In certain aspects, a high energy stream locally heats the material to a temperature above the melting point of the precursor material, for example, to greater than or equal to about 1250° C., which is the melting point of a precursor material ingot comprising of a stoichiometric composition of Al, Fe and Si. As appreciated by those of skill in the art, such melting point temperatures may vary based on the precursor material and alloy system. In certain aspects, the localized area into which the high energy stream is deposited, within a predetermined time period, may have a volume of less than or equal to about 100 µm³, optionally less than or equal to 75 µm³, and in certain variations, optionally less than or equal to about 50 µm³. As appreciated by those of skill in the art, the high energy stream may continuously translate and move on to process contiguous material, thus the predetermined time period may be 1 second or less. Such a high energy stream may be generated by a laser or electron beam.

In certain variations, the high energy stream and formation of the component occurs by an additive manufacturing process. Additive manufacturing is a process by which a solid three-dimensional structure is built layer-by-layer, typically where energy or heat is selectively applied to powder starting materials to solidify, fuse, or sinter and create a layer of solid material. Additive manufacturing is often referred to synonymously with three-dimensional printing. Metal precursors may be used to create solid component structures via additive manufacturing. Non-limiting examples of additive manufacturing processes include powder bed fusion processes, such as laser sintering or laser melting, including direct metal laser sintering and selective laser sintering, electron beam melting including electron beam direct metal melting systems, direct metal deposition, fused deposition modeling, blown powder processes, such as directed energy deposition, wire-fed directed energy deposition, such as wire extrusion processes, and liquid metal 3D printing system with "MagnetJet" technology with metals, such as aluminum alloys, titanium alloys, and steel alloys. A digital three dimensional modeling system can be used to create a digital model of the component to be formed. The physical component can then be formed from the digital model by an additive manufacturing system that creates solid fused structures in a layer-by-layer building process.

In certain aspects, a preferred process for applying a high-energy stream to a precursor material is a direct metal laser sintering (DMLS) process that uses a rapid high energy delivery method to directly melt metal powder in layers. After applying laser energy and locally melting the precursor material, the process is followed by rapid cooling, as the beam moves on to process contiguous precursor materials. DMLS provides local, rapid high energy deposition. Further, DMLS only heats a few milligrams of precursor material at a time (e.g., with a predetermined range of time, such as a few milliseconds (e.g., less than about 3-5 ms) of processing). DMLS provides rapid cooling to underlying layers and is typically a non-equilibrium process. DMLS manufacturing desirably creates large, directional thermal gradients and large local strain. Finally, complex structures can be formed via DMLS manufacturing, so that microchannels, hollow cores, internal stiffeners, and the like can be incorporated into the component design. Direct metal deposition processes may also be used, such as spin melting, blown powder processes, or wire extrusion processes.

Other manufacturing techniques that apply heat in a selective and localized manner and provide high cooling rates may also be used, such as melt-spinning processes.

Thus, the methods of the present disclosure cool the molten precursor material at a rate of greater than or equal to about $1.0 \times 10^5$ K/second to form a solid high strength, lightweight alloy component comprising a stable phase. The cooling rate may be greater than or equal to about $1.0 \times 10^6$ K/second, optionally greater than or equal to about $1.0 \times 10^7$ K/second, optionally greater than or equal to about $1.0 \times 10^8$ K/second, optionally greater than or equal to about $1.0 \times 10^9$ K/second, optionally greater than or equal to about $1.0 \times 10^{10}$ K/second, and in certain variations, optionally greater than or equal to about $1.0 \times 10^{11}$ K/second. By way of example, DMLS cooling rates can typically range from about $10^3$-$10^{11}$ K/second; however, preferred DMLS processes are those that have a cooling rate of about $10^5$-$10^{11}$ K/second.

Thus, the present disclosure takes advantage of rapid solidification rates and associated non-equilibrium processing to stabilize high-symmetry lightweight phases, such as (distorted FCC) $Al_4Fe_{1.7}Si$ ternary phase in the Fe—Al—Si system. Formation of such phases are not possible at cooling rates obtained with normal conventional lightweight metal processing, which has limited the properties of materials produced from aluminum silicon iron system.

In certain aspects, the present disclosure contemplates a method of making a high-strength, lightweight alloy component comprising directing a high-energy stream towards a precursor material in a localized region to melt a portion of the precursor material in the localized region. The precursor material comprises aluminum, silicon, and at least one of iron or nickel. The method includes cooling the molten precursor material at a rate of greater than or equal to about $1.0 \times 10^5$ K/second to form a solid high strength, lightweight alloy component comprising a stable ternary phase having high heat resistance and high strength.

In certain variations, where the precursor comprises aluminum, iron, and silicon, the stable phase that is formed after cooling is an $Al_xFe_ySi_z$ phase, where x ranges from about 4 to about 5, y ranges from about 1.5 to about 2.2, and z is about 1. In certain variations, where the precursor comprises aluminum, iron, and silicon and at least one alloying ingredient selected from the group consisting of manganese, copper, and combinations thereof, the stable cubic phase that is formed after cooling is an $Al_xFe_ySi_z$ phase, where x ranges from about 7.2 to about 7.6, y is about 1.5 to about 2.2, and z is about 1.

In other variations, the precursor material may comprise aluminum, nickel, and silicon, where the stable phase that is formed after cooling is an $Al_xNi_ySi_z$ phase, where x ranges from about 5.8 to about 6.2, y ranges from about 2.8 to about 3.2, and z is about 1.

The precursor material may be a powder. The powder may be a blend of elemental powders or pre-alloyed powders. Thus, the precursor material may comprise aluminum, silicon, and iron, which may be prealloyed or a combination of distinct elemental starting material powders. In certain aspects, it is preferred that the precursor material is prealloyed. In other variations, the precursor material may comprise aluminum, silicon, iron, and optionally an alloying ingredient selected from manganese, copper, or combinations thereof. In other variations, the precursor material may comprise aluminum, nickel, and silicon.

Thus, the present disclosure provides in certain aspects, use of high energy laser processing to stabilize high-temperature desirable phases in low-cost aluminum systems, while a part or component is being made. Select ternary phases may be formed in large amounts within the component through high energy laser processing coupled with rapid cooling rates. A lightweight product or component is produced with a desirable microstructure, without requiring further processing and treatment to create the desired microstructure or desired properties. Further, the methods of the present disclosure can create property gradients by manipulating the processing conditions (and microstructure) as the part is being made. Thus, the components formed via such methods have predominantly the desired stable phase(s) providing exceptional high temperature properties with high oxidation resistance due to the high amount of aluminum. Quasi-equilibrium $Al_xFe_ySi_z$ ternary phases have exceptional stiffness and high temperature strength that can make them suitable for lighter engine valves and turbocharger applications, especially when they are coupled with the design flexibility of additive manufacturing processes (e.g., three dimensional DMLS) to produce complex structures, for example, hollow structures with internal lattice stiffening geometries that cannot be formed via other methods.

High-strength, lightweight alloy components are particularly suitable for use in components of an automobile or other vehicle (e.g., motorcycles, boats), but may also be used in a variety of other industries and applications, including aerospace components, industrial equipment and machinery, farm equipment, heavy machinery, by way of non-limiting example. While not limiting, the present methods and materials are particularly suitable for forming low-cost, lightweight, components stable at high temperatures for a vehicle, including rotating and reciprocating parts of an internal combustion engine, lightweight valves, turbocharger wheels, lightweight pistons, by way of non-limiting example.

The present disclosure further provides in certain aspects a solid high-strength, lightweight alloy component comprising aluminum, silicon, and at least one of iron and/or nickel having a stable ternary cubic phase. By high-strength, it is meant that the component exhibits a tensile strength of greater than or equal to about 450 MPa, optionally greater than or equal to about 500 MPa, optionally greater than or equal to about 600 MPa, optionally greater than or equal to about 700 MPa, optionally greater than or equal to about 800 MPa, optionally greater than or equal to about 900 MPa, optionally greater than or equal to about 1,000 MPa, optionally greater than or equal to about 1,100 MPa, optionally greater than or equal to about 1,300 MPa, optionally greater than or equal to about 1,400 MPa, optionally greater than or equal to about 1,500 MPa, and in certain aspects, optionally greater than or equal to about 1,600 MPa. By lightweight, it is meant that the material forming the component has a density of less than or equal to about 5 g/cm$^3$, optionally less than or equal to about 4 g/cm$^3$ in certain variations.

In certain aspects, the high-strength, lightweight alloy component further exhibits high stiffness and good stability and strength at high or elevated temperatures. High or elevated temperatures may be considered those that are greater than or equal to about 800° C. Thus, high strength at an elevated temperature (e.g., of greater than or equal to about 800° C.) may be considered to be greater than or equal to about 400 MPa, optionally greater than or equal to about 500 MPa, optionally greater than or equal to about 600 MPa, optionally greater than or equal to about 700 MPa, optionally greater than or equal to about 800 MPa, and in certain variations, optionally greater than or equal to about 900 MPa. High stiffness at an elevated temperature (e.g., of greater than or equal to about 800° C.) may be considered to be a Young's modulus of greater than or equal to about 110 GPa; optionally greater than or equal to about 120 GPa, optionally greater than or equal to about 130 GPa, optionally greater than or equal to about 140 GPa, optionally greater than or equal to about 150 GPa, and in certain variations, optionally greater than or equal to about 160 GPa.

In certain variations, the solid high-strength lightweight alloy component comprises greater than or equal to about 45% by volume of the stable ternary phase, optionally greater than or equal to about 50% by volume of the stable ternary phase, optionally greater than or equal to about 60% by volume of the stable ternary phase, optionally greater than or equal to about 75% by volume of the stable ternary phase, optionally greater than or equal to about 80% by volume of the stable ternary phase, optionally greater than or equal to about 85% by volume of the stable ternary phase, optionally greater than or equal to about 90% by volume of the stable ternary phase, optionally greater than or equal to about 95% by volume of the stable ternary phase, optionally greater than or equal to about 97% by volume of the stable ternary phase, optionally greater than or equal to about 98% by volume of the stable ternary phase, and optionally greater than or equal to about 99% by volume of the stable ternary phase in other aspects.

The present disclosure thus contemplates in certain aspects, a solid high-strength, lightweight alloy component comprising greater than or equal to about 50 volume % of a stable $Al_xFe_ySi_z$ phase, wherein x ranges from about 4 to about 5 or about 7.2 to about 7.6, y ranges from about 1.5 to about 2.2, and z is about 1. The stable $Al_xFe_ySi_z$ phase optionally has a formula represented by $Al_4Fe_{1.7}Si$ or $Al_5Fe_2Si$, with a composition comprising aluminum at greater than or equal to about 64.5 to less than or equal to about 66 atomic weight %; iron at about 24.5 atomic weight %; and silicon at greater than or equal to about 9.5 to less than or equal to about 11 atomic weight %. The stable $Al_xFe_ySi_z$ phase has an (a) lattice parameter of about 0.7509 nm and a (c) lattice parameter of about 0.7594 nm and a space group of $P6_3/mmc$. In other aspects, the precursor material further comprises less than or equal to about 0.5 mass % of an alloying element selected from the group consisting of: manganese, copper, and combinations thereof. Such a stable phase $Al_xFe_ySi_z$ may have x ranging from about 7.2 to about 7.6, for example, $Al_{7.4}Fe_2Si$. The solid high-strength lightweight alloy component comprises greater than or equal to about 75% by volume of the stable $Al_xFe_ySi_z$ phase in certain aspects. In other aspects, the solid high-strength lightweight alloy component comprises greater than or equal to about 80% by volume of the stable $Al_xFe_ySi_z$ phase, optionally greater than or equal to about 90% by volume.

In yet other aspects, a solid high-strength, lightweight alloy component comprising greater than or equal to about 50 volume % of a stable $Al_6Ni_3Si$ phase, comprising aluminum at greater than or equal to about 58.6 to less than or equal to about 61 atomic weight %; nickel at about 30 atomic weight %; and silicon at greater than or equal to about 9 to less than or equal to about 11.4 atomic weight %. In other aspects, the solid high-strength lightweight alloy component comprises greater than or equal to about 80% by volume of the stable $Al_6Ni_3Si$ phase.

Various embodiments of the inventive technology can be further understood by the specific examples contained herein. Specific Examples are provided for illustrative purposes of how to make and use the compositions, devices, and methods according to the present teachings and, unless explicitly stated otherwise, are not intended to be a representation that given embodiments of this invention have, or have not, been made or tested.

Examples

A component having a stable cubic $Al_xFe_ySi_z$ phase is formed via a melt-spinning process. To perform melt-spinning, an ingot is first prepared by induction-melting of high-purity elemental Al, Fe, and Si at the stoichiometric $Al_4Fe_{1.7}Si$ in an argon atmosphere. The as-prepared ingot is then re-melted and the melt is dripped onto an internally-cooled wheel surface to achieve rapid solidification. The cooling rate is dependent on the wheel speed; it is about $10^5$ K/second in this experiment. Melt-spinning can have a cooling rate ranging from $10^4$-$10^7$ K/second.

Figures 3A, 3B, 3C:
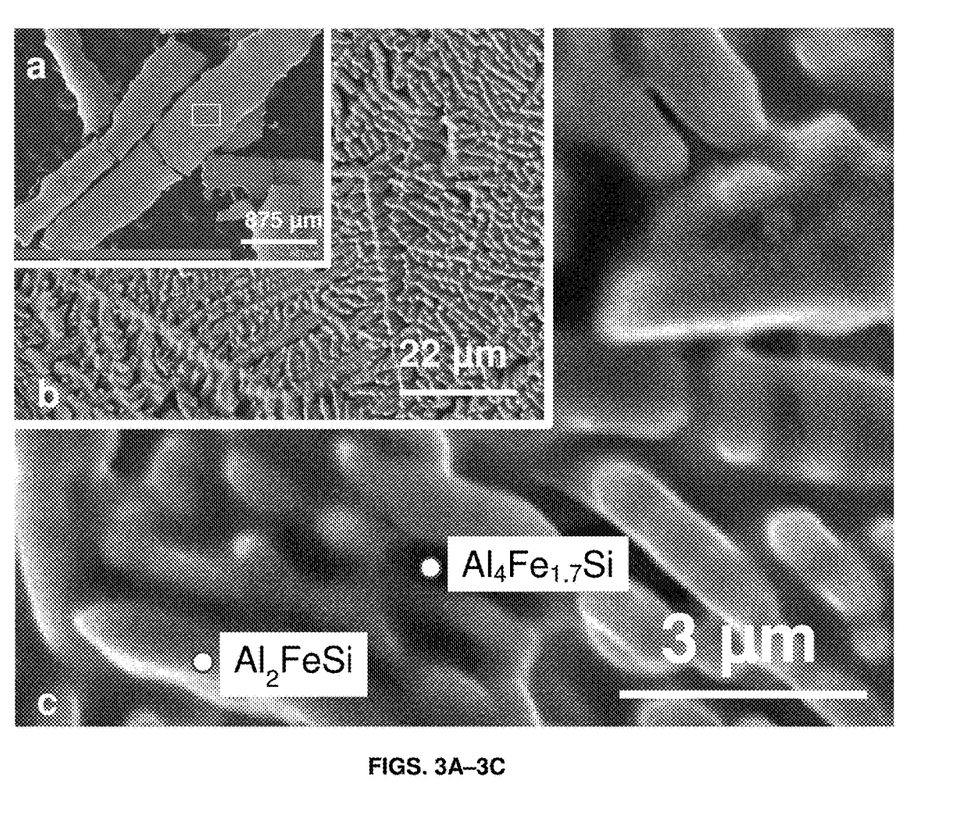
FIG. 3A shows melt-spun ribbons with a scale bar of 875 micrometers (μm).
FIG. 3B is a magnified view of the rectangular area shown in FIG. 3A with a scale bar of 22
FIG. 3C is a further magnified view of the rectangular area shown in FIG. 3A with a scale bar of 3 showing $Al_2FeSi$ and $Al_4Fe_{1.7}Si$ phases. Composition of the phases was determined by EDS.
Figure 4:
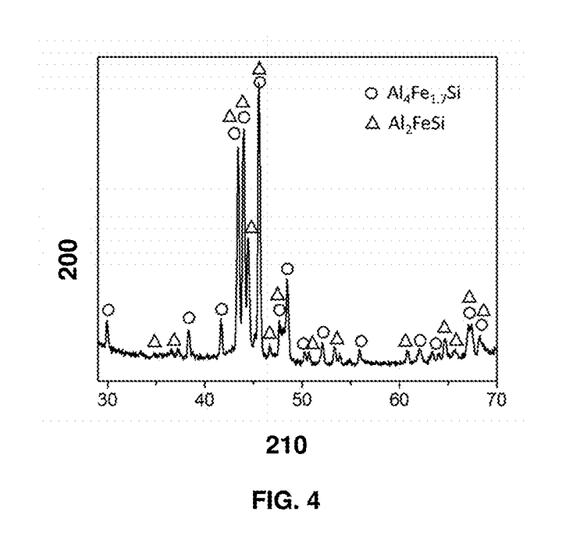
FIG. 4 shows x-ray diffraction patterns (XRD) for the $Al_2FeSi$ and $Al_4Fe_{1.7}Si$ phases in the melt-spun ribbons comprising aluminum, iron, and silicon shown in FIGS. 3A-3C.

The melt-spun ribbons are examined by scanning electron microscopy (SEM) (morphology) shown in FIGS. 3A-3C, XRD (crystal structure) as shown in FIG. 4, and EDS (composition). FIG. 4 shows x-ray diffraction patterns (XRD) of intensity (a.u.) 200 versus 2-Theta (°) 210. From SEM, EDS and XRD, two phases are determined: an $Al_4Fe_{1.7}Si$ (continuous major phase in the SEM images of FIGS. 3A-3C) and $Al_2FeSi$ (dendritic phase in FIGS. 3A-3C). The volume ratio of these two phases can be semi-quantified by Rietveld refinement of XRD pattern. $Al_4Fe_{1.7}Si$ is present at about 45% volume fraction, while $Al_2FeSi$ is present at 55% volume fraction.

It is believed that processes having higher cooling rates will enable formation of higher amounts of the desired stable cubic $Al_4Fe_{1.7}Si$ phase, for example, approaching 100%. For example, high energy processes like the laser and e-beam processes described above provide the capability of locally melting the precursor material followed by rapid cooling, as the beam moves on to process contiguous precursor materials to create large, directional thermal gradients and large local strain that stabilizes the desired phase or phases. When the precursor material is a powder, it may be processed by a high energy laser or e-beam to provide cooling conditions to stabilize the desirable phases, while also making the component with the desired shape.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A solid high-strength, lightweight alloy component comprising greater than or equal to about 50 volume % of a stable $Al_xFe_ySi_z$ phase, wherein x ranges from about 4 to about 5 or about 7.2 to about 7.6, y ranges from about 1.5 to about 2.2, and z is about 1.

2. The solid high-strength, lightweight alloy component of claim 1, wherein the stable $Al_xFe_ySi_z$ phase has a formula represented by $Al_4Fe_{1.7}Si$ or $Al_5Fe_2Si$, with a composition comprising aluminum at greater than or equal to about 64.5 to less than or equal to about 66 atomic weight %; iron at about 24.5 atomic weight %; and silicon at greater than or equal to about 9.5 to less than or equal to about 11 atomic weight %.

3. The solid high-strength, lightweight alloy component of claim 1, wherein the stable $Al_xFe_ySi_z$ phase has an (a) lattice parameter of about 0.7509 nm and a (c) lattice parameter of about 0.7594 nm and a space group of $P6_3/mmc$.

4. The solid high-strength, lightweight alloy component of claim 1, further comprising less than or equal to about 0.5 weight % of an alloying element selected from the group consisting of: manganese, copper, and combinations thereof, where x ranges from about 7.2 to about 7.6.

5. A method of making the high-strength, lightweight alloy component of claim 1, the method comprising:
   directing an energy stream towards a precursor material in a localized region to melt a portion of the precursor material in the localized region, wherein the precursor material comprises aluminum, silicon, and iron; and
   cooling the molten precursor material at a rate of greater than or equal to about $1.0 \times 10^5$ K/second to form the solid high strength, lightweight alloy component.

6. The method of making the high-strength, lightweight alloy component of claim 5, wherein the directing the energy stream occurs during an additive manufacturing process.

7. A solid high-strength, lightweight alloy component comprising greater than or equal to about 80 volume % of a stable $Al_xFe_ySi_z$ phase, wherein x ranges from about 4 to about 5 or about 7.2 to about 7.6, y ranges from about 1.5 to about 2.2, and z is about 1.

8. The solid high-strength, lightweight alloy component of claim 7, wherein the stable $Al_xFe_ySi_z$ phase has a formula represented by $Al_4Fe_{1.7}Si$ or $Al_5Fe_2Si$, with a composition comprising aluminum at greater than or equal to about 64.5 to less than or equal to about 66 atomic weight %; iron at about 24.5 atomic weight %; and silicon at greater than or equal to about 9.5 to less than or equal to about 11 atomic weight %.

9. The solid high-strength, lightweight alloy component of claim 7, wherein the stable $Al_xFe_ySi_z$ phase has an (a) lattice parameter of about 0.7509 nm and a (c) lattice parameter of about 0.7594 nm and a space group of $P6_3/mmc$.

10. The solid high-strength, lightweight alloy component of claim 7, wherein the solid high-strength lightweight alloy component comprises greater than or equal to about 80% by volume of the stable $Al_xFe_ySi_z$ phase.

11. The solid high-strength, lightweight alloy component of claim 7, further comprising less than or equal to about 0.5 weight % of an alloying element selected from the group consisting of: manganese, copper, and combinations thereof, where x ranges from about 7.2 to about 7.6.

12. A method of making the high-strength, lightweight alloy component of claim 7, the method comprising:
   directing an energy stream towards a precursor material in a localized region to melt a portion of the precursor material in the localized region, wherein the precursor material comprises aluminum, silicon, and iron; and
   cooling the molten precursor material at a rate of greater than or equal to about $1.0 \times 10^5$ K/second to form the solid high strength, lightweight alloy component.

13. The method of making the high-strength, lightweight alloy component of claim 12, wherein the directing the energy stream is part of an additive manufacturing process.

14. An automotive component comprising greater than or equal to about 50 volume % of a stable $Al_xFe_ySi_z$ phase, wherein x ranges from about 4 to about 5 or about 7.2 to about 7.6, y ranges from about 1.5 to about 2.2, and z is about 1.

15. The automotive component of claim 14 selected from the group consisting of: an internal combustion engine component, a valve, a piston, a turbocharger component, a wheel, and combinations thereof.

16. The automotive component of claim 14, wherein the stable $Al_xFe_ySi_z$ phase has a formula represented by $Al_4Fe_{1.7}Si$ or $Al_5Fe_2Si$, with a composition comprising aluminum at greater than or equal to about 64.5 to less than or equal to about 66 atomic weight %; iron at about 24.5 atomic weight %; and silicon at greater than or equal to about 9.5 to less than or equal to about 11 atomic weight %.

17. The automotive component of claim 14, wherein the stable $Al_xFe_ySi_z$ phase has an (a) lattice parameter of about 0.7509 nm and a (c) lattice parameter of about 0.7594 nm and a space group of $P6_3/mmc$.

18. The automotive component of claim 14 comprising greater than or equal to about 80% by volume of the stable $Al_xFe_ySi_z$ phase.

19. A method of making the automotive component of claim 14, the method comprising:
   directing an energy stream towards a precursor material in a localized region to melt a portion of a precursor material in the localized region, wherein the precursor material comprises aluminum, silicon, and iron; and cooling the molten precursor material at a rate of greater than or equal to about $1.0 \times 10^5$ K/second to form the automotive component.

20. The method of making the automotive component of claim 19, wherein the directing the energy stream occurs during an additive manufacturing process.

* * * * *